(12) United States Patent
Chen (10) Patent No.: US 11,082,805 B2
(45) Date of Patent: Aug. 3, 2021

(54) TERMINAL AND METHOD FOR TRANSMITTING DATA

(71) Applicant: Guangdong Oppo Mobile Telecommunications Corp., Ltd., Guangdong (CN)

(72) Inventor: Biao Chen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 55 days.

(21) Appl. No.: 16/437,833

(22) Filed: Jun. 11, 2019

(65) Prior Publication Data

US 2019/0387362 A1   Dec. 19, 2019

(30) Foreign Application Priority Data

Jun. 19, 2018 (CN) .......................... 201810629848.9

(51) Int. Cl.
*H04W 4/029*   (2018.01)
*H04L 27/36*   (2006.01)
(Continued)

(52) U.S. Cl.
CPC .......... *H04W 4/029* (2018.02); *H04L 27/364* (2013.01); *H04W 4/025* (2013.01);
(Continued)

(58) Field of Classification Search
USPC ....................................................... 370/329
See application file for complete search history.

(56) References Cited

U.S. PATENT DOCUMENTS

| | | | |
|---|---|---|---|
| 9,503,149 B1* | 11/2016 | Hong | ........................ H04B 1/40 |
| 2007/0192872 A1* | 8/2007 | Rhoads | .............. H04N 1/32144 |
| | | | 726/26 |

(Continued)

FOREIGN PATENT DOCUMENTS

| | | |
|---|---|---|
| CN | 103379655 A | 10/2013 |
| CN | 105099492 A | 11/2015 |

(Continued)

OTHER PUBLICATIONS

International search report issued in corresponding international application No. PCT/CN2019/090751 dated Sep. 2, 2019.

(Continued)

*Primary Examiner* — Gregory B Sefcheck
*Assistant Examiner* — Majid Esmaeilian (57) ABSTRACT

A terminal and a method for transmitting data are provided. The method for transmitting data is applicable to a terminal comprising a LAN-wireless communication module, and the method includes the following. A LAN-wireless communication module is enabled in response to detecting a request for launching a predetermined application. The LAN-wireless communication module is adjusted to operate in an operation mode. An AD-HOC network is established with other terminals via a scanning and connecting operation, a distance between the other terminals and the terminal being less than or equal to a preset distance. Target data is transmitted within the AD-HOC network.

20 Claims, 6 Drawing Sheets

(51) Int. Cl.
*H04W 4/02* (2018.01)
*H04W 64/00* (2009.01)
*H04W 88/04* (2009.01)
*H04W 84/18* (2009.01)

(52) U.S. Cl.
CPC ......... *H04W 64/003* (2013.01); *H04W 88/04* (2013.01); *H04W 84/18* (2013.01)

(56) References Cited

U.S. PATENT DOCUMENTS

| | | |
|---|---|---|
| 2012/0218979 A1 | 8/2012 | Yeh et al. |
| 2013/0080954 A1* | 3/2013 | Carlhian ........... H04M 1/27475 715/769 |
| 2013/0100017 A1* | 4/2013 | Papakipos ............. G06F 1/1694 345/158 |
| 2013/0177047 A1 | 7/2013 | Kwak et al. |
| 2014/0368601 A1* | 12/2014 | deCharms ............. H04L 65/403 348/14.02 |
| 2016/0020737 A1 | 1/2016 | Kong et al. |
| 2017/0118589 A1* | 4/2017 | Chaise ................... H04W 4/02 |
| 2018/0279199 A1* | 9/2018 | Karakkad Kesavan Namboodiri ......... H04W 76/10 |

FOREIGN PATENT DOCUMENTS

| | | |
|---|---|---|
| CN | 106253941 A | 12/2016 |
| CN | 106788569 A | 5/2017 |
| CN | 106792545 A | 5/2017 |
| CN | 107222233 A | 9/2017 |
| CN | 206657863 U | 11/2017 |
| WO | 2007129716 A1 | 11/2007 |
| WO | 2016200205 A1 | 12/2016 |

OTHER PUBLICATIONS

Extended European search report issued in corresponding European application No. 19180918.5 dated Nov. 14, 2019.
English translation of the second office action issued in corresponding CN application No. 201810629848.9 dated Jun. 2, 2020.
English translation of the first office action issued in corresponding CN application No. 201810629848.9 dated Dec. 4, 2019.
Examination report issued in corresponding IN application No. 201914023433 dated Nov. 10, 2020.

* cited by examiner

TERMINAL AND METHOD FOR TRANSMITTING DATA

CROSS-REFERENCE TO RELATED APPLICATIONS

This application claims priority to Chinese Patent Application No. 201810629848.9, filed on Jun. 19, 2018, the disclosure of which is hereby incorporated by reference in its entirety.

TECHNICAL FIELD

This disclosure relates to the technical field of terminals, and particularly to a terminal and a method for transmitting data.

BACKGROUND

At present, terminals on the market are generally provided with a Bluetooth module or a Wireless Fidelity (Wi-Fi) module, which can realize point-to-point data sharing in a local area network (LAN) within a short distance. However, the distance for data transmission is limited, and long-distance data sharing cannot be realized.

SUMMARY

In a first aspect, a terminal is provided according to the embodiments of the present disclosure. The terminal includes an antenna, a LAN-wireless communication module coupled with the antenna, and an application processor coupled with the LAN-wireless communication module.

The LAN-wireless communication module is operable in a bypass mode and an operation mode. The operation mode is configured for implementing an enhanced signal transmission-reception function in LAN and a signal transmitted by the terminal has an effective transmission distance greater than a preset distance.

In a second aspect, a method for transmitting data is provided according to the embodiments of the present disclosure. The method for transmitting data is applicable to the terminal including a LAN-wireless communication module. The method includes the following.

The LAN-wireless communication module is enabled in response to detecting a request for launching a predetermined application. The LAN-wireless communication module is adjusted to operate in an operation mode. An AD-HOC network is established with other terminals via a scanning and connecting operation, where a distance between the other terminals and the terminal is less than or equal to a preset distance. As such, target data is transmitted within the AD-HOC network.

In a third aspect, a terminal is provided. The terminal includes a processor, a memory, and one or more programs stored in the memory. The one or more programs are configured to be executed by the processor and include instructions operable to execute all or part of the operations described in the second aspect of the embodiments of the disclosure.

BRIEF DESCRIPTION OF THE DRAWINGS

To describe technical solutions in embodiments of the present disclosure more clearly, the following briefly introduces the accompanying drawings required for describing the embodiments. Apparently, the accompanying drawings in the following description illustrate some embodiments of the present disclosure. Those of ordinary skill in the art may also obtain other drawings based on these accompanying drawings without creative efforts.

DETAILED DESCRIPTION

In order for those skilled in the art to better understand solutions of the present disclosure, technical solutions in embodiments of the present disclosure will be described clearly and completely hereinafter with reference to the accompanying drawings. Apparently, the described embodiments are merely some rather than all embodiments of the present disclosure. All other embodiments obtained by those of ordinary skill in the art based on the embodiments of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the embodiment may be contained in at least one embodiment of the present disclosure. The phrase appearing in various places in the specification does not necessarily refer to the same embodiment, nor does it refer to an independent or alternative embodiment that is mutually exclusive with other embodiments. It is expressly and implicitly understood by those skilled in the art that an embodiment described herein may be combined with other embodiments.

The terminal involved in embodiments of the present disclosure may include various handheld devices, in-vehicle devices, wearable devices, computing devices that have wireless communication functions or other processing devices connected to the wireless modem, as well as various forms of user equipments (UE), mobile stations (MS), terminal devices, and the like.

Hereinafter, embodiments of the disclosure will be interpreted in detail.

Figure 1A:
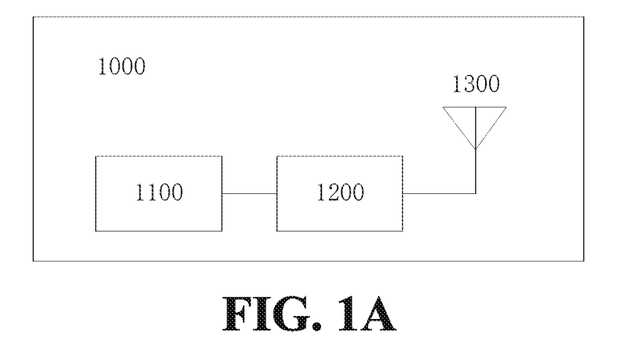
FIG. 1A is a block diagram illustrating a terminal according to an embodiment of the present disclosure.

The FIG. 1A is a block diagram illustrating a terminal 1000 according to an embodiment of the present disclosure. As illustrated in FIG. 1A, the terminal 1000 includes an application processor 1100, a local area network (LAN)-wireless communication module 1200, and an antenna 1300. The application processor 1100 is coupled with the LAN-wireless communication module 1200. The LAN-wireless communication module 1200 is coupled with the antenna 1300.

The LAN-wireless communication module 1200 is operable in an operation mode. When the LAN-wireless communication module operates in the operation mode, the terminal is configured to implement an enhanced signal transmission-reception function in LAN and a signal transmitted by the terminal has an effective transmission distance greater than a preset distance.

When the LAN-wireless communication module operates in the operation mode, the terminal is configured to transmit the signal via an external power amplifier and receive the signal via an external low-noise filter of the LAN-wireless communication module.

The LAN-wireless communication module 1200 can also be operable in a bypass mode. When the LAN-wireless communication module operates in the bypass mode, the terminal is configured to implement a short-haul signal transmission-reception function in the LAN and a signal transmitted by the terminal has an effective transmission distance less than the preset distance.

The application processor 1100 is a control center of the terminal, which can connect various parts of the entire terminal via various interfaces and lines. The application processor 1100 executes various functions of the terminal and processes data by running or executing software programs and/or modules stored in the memory and calling data stored in the memory, thereby monitoring the terminal as a whole. The application processor 1100 mainly deals with operating systems, user interfaces, applications, and the like.

The preset distance may be 500 m, 1 km, etc., which is not limited therein. The preset distance can be specified by setting software parameters and/or hardware parameters of the LAN-wireless communication module. The communication protocol supported with aid of the LAN-wireless communication module includes but is not limited to any of the following: Bluetooth protocol, wireless fidelity (Wi-Fi) protocol, and ZigBee protocol.

Taking a Bluetooth communication module as an example, in terms of the hardware implementation of a Bluetooth modem, a receiver, and a transmitter, the following technologies need to be adopted.

(1) The transmitter adopts a polar architecture, thereby improving the efficiency of the external power amplifier and reducing the peak-to-average power ratio (PAPR) requirement. (2) Since the data rate of enhanced data transmission is low, the bandwidth of modulation signal is lower than bandwidth of the phase-locked loop (PLL) circuit module, and one point modulation can be adopted on the basis of the polar architecture. (3) The receiver uses the Low-intermediate frequency (Low-IF) architecture to reduce the impact of flicker noise on sensitivity. (4) A analog-to-digital converter (ADC) of the receiver uses a Quadrature bandpass sigma-delta ADC (SD-ADC). (5) SD-ADC has adjustable center frequency and bandwidth, and the optimal noise transfer function (NTF) is obtained based on bandwidth of a traditional signal and bandwidth of an enhanced signal to suppress quantization noise. (6) A modem has an adjustable clock, and for enhanced signal transmission, low-speed transmission can be achieved by directly dividing the original frequency of the clock by 8 or 16. (7) Since data rate of the signal is low and there is large in-band available bandwidth, the BT frequency band in the pulse shaping filter (PSF) can be increased to suppress the interference due to the inter symbol interference (ISI) codes.

As can be seen, in the embodiments of the present disclosure, the terminal can implement an enhanced data transmission with aid of the LAN-wireless communication module, thereby increasing an effective distance that the terminal performs LAN communication, which is beneficial to expand the use of LAN communication function of the terminal, satisfy various requirements of specific scenarios such as a scenario without mobile network, and expand functionality and applicability of the terminal.

Figure 1B:
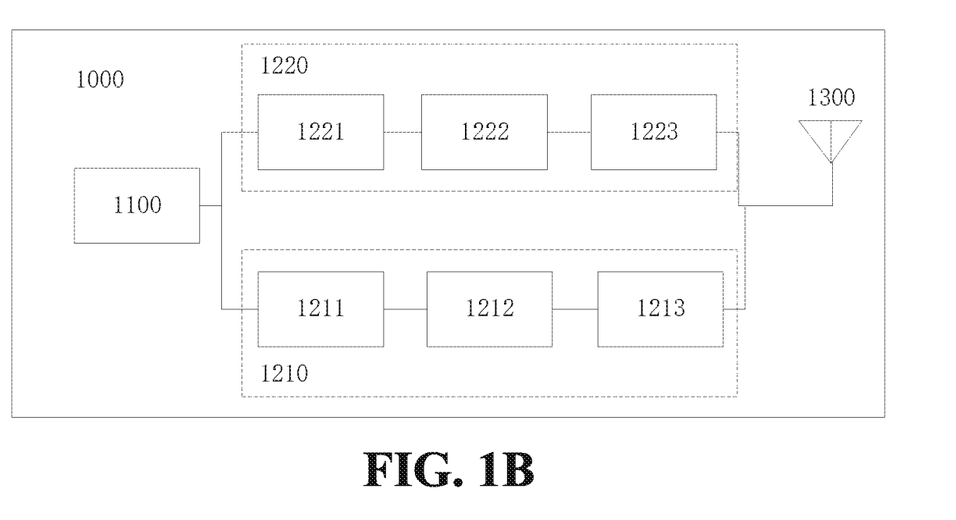
FIG. 1B is a block diagram illustrating a terminal according to another embodiment of the present disclosure.

As an embodiment, as illustrated in FIG. 1B, the LAN-wireless communication module 1200 includes a received-signal processing circuit 1210 and a transmitted-signal processing circuit 1220.

The transmitted-signal processing circuit 1220 includes a modulation circuit module 1221, a transmitter 1222, and an external power amplifier 1223. The received-signal processing circuit 1210 includes a demodulation circuit module 1211, a receiver 1212, and an external low-noise filter 1213.

The application processor 1100 is coupled with the modulation circuit module 1221 and a demodulation circuit module 1211. The modulation circuit module 1221 is coupled with the transmitter 1222. The transmitter 1222 is coupled with the external power amplifier 1223. The external power amplifier 1223 is coupled with the antenna 1300. The demodulation circuit module 1211 is coupled with the receiver 1212. The receiver 1212 is coupled with the external low-noise filter 1213. The external low-noise filter 1213 is coupled with the antenna 1300.

The external power amplifier 1223 is operable in the operation mode, that is, the terminal is configured to transmit the signal via the external power amplifier 1223. The operation mode is configured for implementing an enhanced signal-transmission function in the LAN, and the enhanced signal-transmission function has an effective transmission distance greater than the preset distance.

The external low-noise filter 1213 is operable in the operation mode, that is, the terminal is configured to receive the signal via the external low-noise filter 1213. The operation mode is configured for implementing an enhanced signal-reception function in the LAN, and the enhanced signal-reception function has an effective transmission distance greater than the preset distance.

The modulation circuit module 1221 and the demodulation circuit module 1211 are generally integrated to be a modem as a separate device disposed in the terminal.

As can be seen, in this embodiment, in the mobile terminal, on the basis of an original LAN-wireless communication module, the external power amplifier is added to the transmitted-signal processing circuit, and the external low-noise filter is added to the received-signal processing circuit, thereby increasing transmitting power and improving receiving sensitivity. The communication module is modified slightly, and an original wireless communication protocol is directly multiplexed, thus high setting efficiency is achieved with low function expansion cost, and the manner in which modes are switched is convenient and efficient.

Figure 1C:
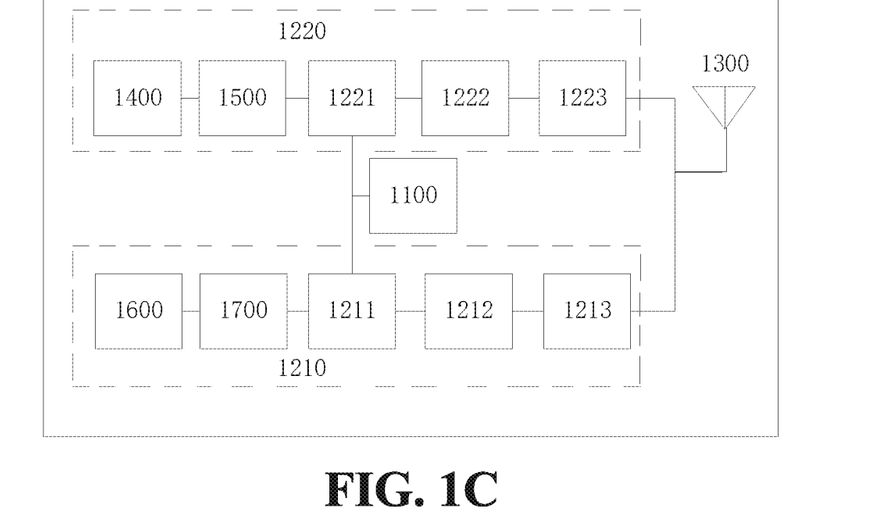
FIG. 1C is a block diagram illustrating a terminal according to another embodiment of the present disclosure.

As an embodiment, as illustrated in FIG. 1C, the terminal 1000 further includes a microphone 1400 and an audio encoder 1500. The microphone 1400 is coupled with the audio encoder 1500. The audio encoder 1500 is coupled with modulation circuit module 1221.

The terminal 1000 further includes an audio decoder 1600 and a speaker 1700. The audio decoder 1600 is coupled with the speaker 1700. The speaker 1700 is coupled with the demodulation circuit module 1211.

As can be seen, in this embodiment, since the microphone, the audio encoder, the audio decoder, and the speaker can process voice data, types of data supported by the enhanced data transmission function of the terminal can be extended to the voice data, thereby further improving the applicability of the enhanced data transmission function.

Figure 1D:
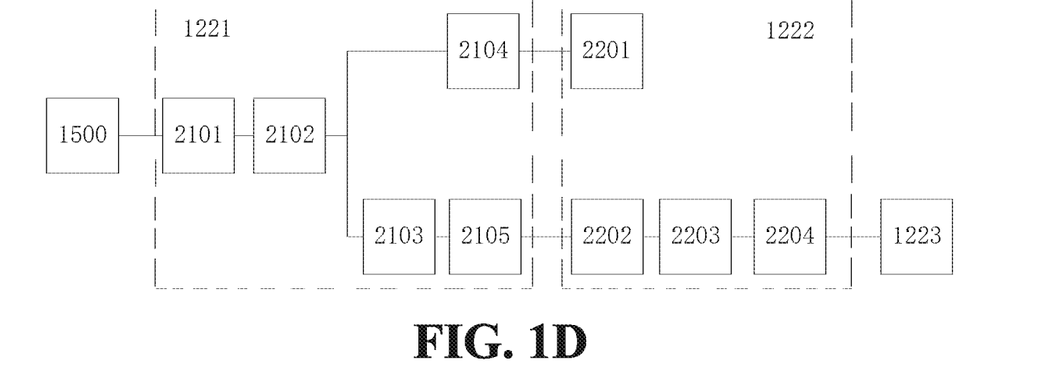
FIG. 1D is a block diagram illustrating a modulation circuit module and a transmitter according to an embodiment of the present disclosure.

As an embodiment, as illustrated in FIG. 1D, the modulation circuit module 1221 includes a first digital-signal processing chip 2101, a coordinate rotation digital computer (Cordic) 2102 (such as catesian to polar), a differential circuit module 2103, a first digital-to-analog converter 2104, and a second digital-to-analog converter 2105. The transmitter 1222 includes a first low-pass filter 2201, a second low-pass filter 2202, a phase-locked loop circuit module 2203, and an integrated power amplifier 2204.

The first digital-signal processing chip 2101 is coupled with the coordinate rotation digital computer 2102. The coordinate rotation digital computer 2102 is coupled with the first digital-to-analog converter 2104 and the differential circuit module 2103. The differential circuit module 2103 is coupled with the second digital-to-analog converter 2105. The first digital-to-analog converter 2104 is coupled with the first low-pass filter 2201. The second digital-to-analog converter 2105 is coupled with the second low-pass filter 2202. The second low-pass filter 2202 is coupled with the phase-locked loop circuit module 2203. The phase-locked loop circuit module 2203 is coupled with the integrated power amplifier 2204. The integrated power amplifier 2204 is coupled with an external power amplifier 1223.

As can be seen, in this embodiment, the polar architecture is adopted for the transmitter to improve the efficiency of the external power amplifier and reduce the PAPR requirement. The clock of the modem is adjustable, and the enhanced signal transmission-reception function can implement a low-speed transmission by directly dividing the original frequency of the lock by 8 or 16.

Figure 1E:
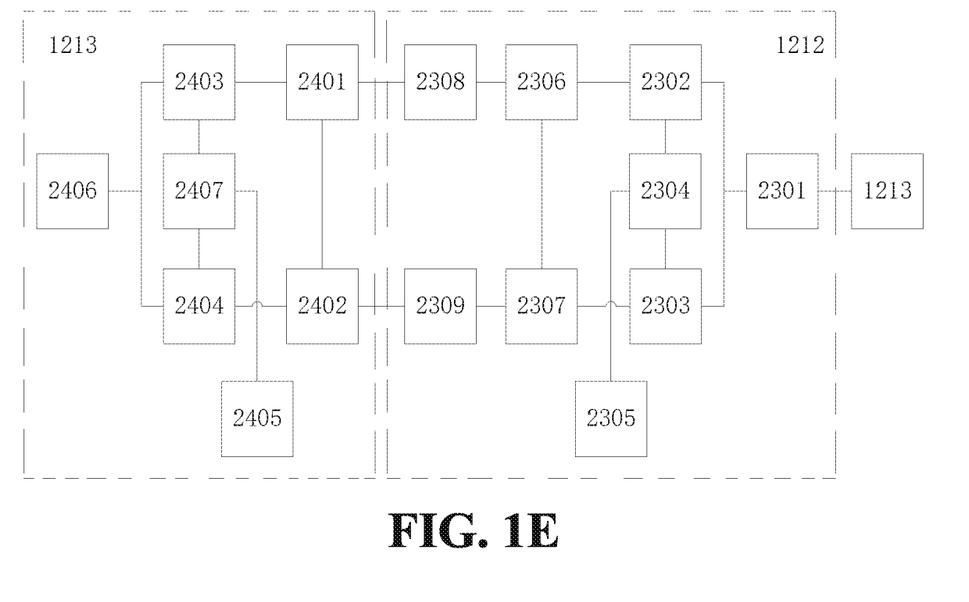
FIG. 1E is a block diagram illustrating a receiver and a demodulation circuit module according to an embodiment of the present disclosure.

As an embodiment, as illustrated in FIG. 1E, the receiver 1212 includes an integrated low-noise filter 2301, a first mixer 2302, a second mixer 2303, a first in-phase and quadrature (IQ) phase modulation module 2304, a first local oscillator 2305, a first image-reject filter 2306, a second image-reject filter 2307, a first variable gain amplifier 2308, and a second variable gain amplifier 2309.

The demodulation circuit module 1211 includes a first analog-to-digital converter 2401, a second analog-to-digital converter 2402, a third mixer 2403, a fourth mixer 2404, a second IQ phase modulation module 2405, a second digital-signal processing chip 2406, and a second local oscillator 2407.

The external low-noise filter 1213 is coupled with the integrated low-noise filter 2301. The integrated low-noise filter 2301 is coupled with the first mixer 2302 and the second mixer 2303. The first mixer 2302 and the second mixer 2303 are coupled with the first IQ phase modulation module 2304. The first IQ phase modulation module 2304 is coupled with the first local oscillator 2305. The first mixer 2302 is coupled with the first image-reject filter 2306. The first image-reject filter 2306 is coupled with the first variable gain amplifier 2308. The first variable gain amplifier 2308 is coupled with the first analog-to-digital converter 2401. The first analog-to-digital converter 2401 is coupled with the third mixer 2403. The third mixer 2403 is coupled with the second digital-signal processing chip 2406. The second image-reject filter 2307 is coupled with the second variable gain amplifier 2309. The second variable gain amplifier 2309 is coupled with the second analog-to-digital converter 2402. The second analog-to-digital converter 2402 is coupled with the fourth mixer 2404. The fourth mixer 2404 is coupled with the second digital-signal processing chip 2406. The third mixer 2403 and the fourth mixer 2404 are coupled with the second IQ phase modulation module 2405. The second IQ phase modulation module 2405 is coupled with the second local oscillator 2407.

The first image-reject filter 2306 is coupled with the second image-reject filter 2307, and the first analog-to-digital converter 2401 is coupled with the second analog-to-digital converter 2402.

As can be seen, in the embodiments, analog-to-digital converters of the receiver use Quadrature bandpass SD-ADC. Since the center frequency and the bandwidth of the SD-ADC are adjustable, the optimal NTF is obtained based on bandwidth of the traditional signal and the enhanced signal to suppress quantization noise. The clock of the modem is adjustable, and the enhanced signal transmission-reception function can implement a low-speed transmission by directly dividing the original frequency of the lock by 8 or 16.

Figure 1F:
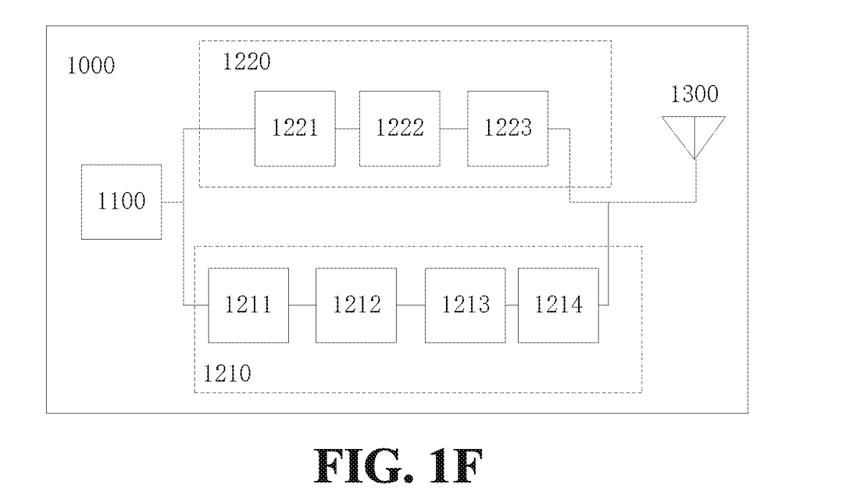
FIG. 1F is a block diagram illustrating a terminal according to another embodiment of the present disclosure.

As an embodiment, as illustrated in FIG. 1F, the received-signal processing circuit 1210 further includes a pre-filter 1214, and the pre-filter 1214 is coupled with the antenna 1300 and the external low-noise filter 1213.

As can be seen, in this embodiment, the pre-filter 1214 is provided to further filter out clutter, thereby improving reception stability.

Figure 2A:
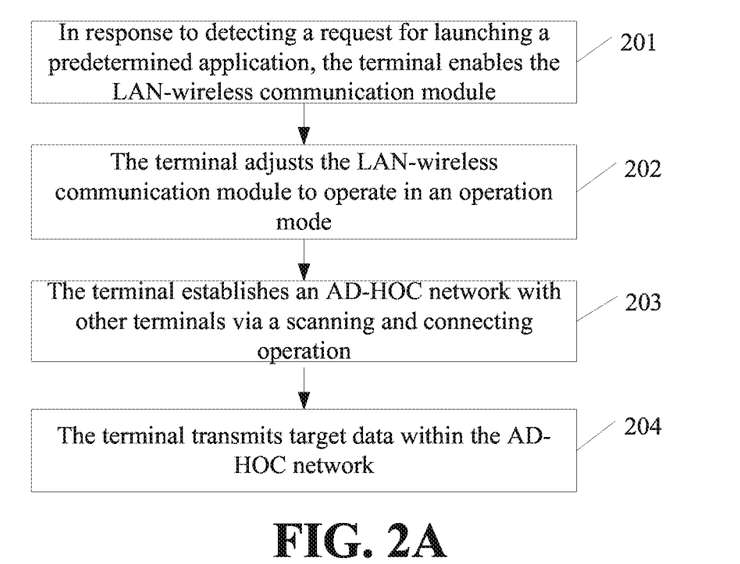
FIG. 2A is a flowchart illustrating a method for transmitting data according to an embodiment of the present disclosure.

FIG. 2A is a flowchart illustrating a method for transmitting data according to an embodiment of the present disclosure. The method for transmitting data is applicable to the terminal as illustrated in FIG. 1A to 1F. The terminal includes a LAN-wireless communication module. As illustrated in FIG. 2A, the method or transmitting data begins with operations at block 201.

At block 201, in response to detecting a request for launching a predetermined application, the terminal enables the LAN-wireless communication module.

Figure 2B:
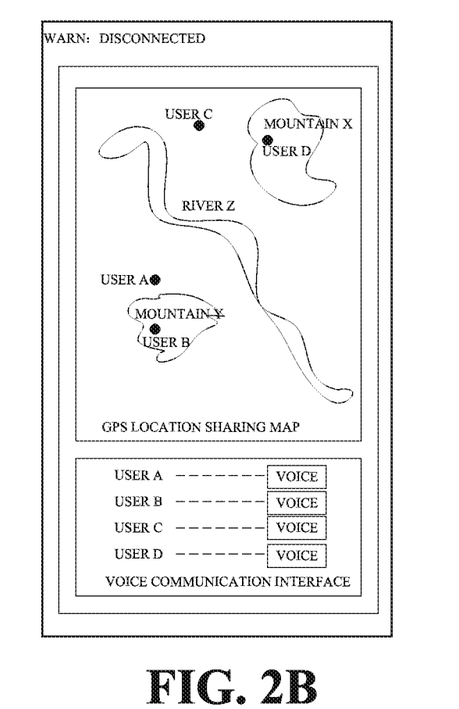
FIG. 2B is a diagram illustrating a predetermined interface according to an embodiment of the present disclosure.

The predetermined application can be a system application or a third-party application, which is not limited herein. The predetermined application is configured to transmit data other terminals within an AD-HOC network. As illustrated in FIG. 2B, FIG. 2B is a diagram illustrating a predetermined interface of the predetermined application according to an embodiment of the present disclosure.

At block 202, the terminal adjusts the LAN-wireless communication module to operate in an operation mode.

At block 203, the terminal establishes an AD-HOC network with other terminals via a scanning and connecting operation, a distance between the other terminals and the terminal being less than or equal to a preset distance.

The AD-HOC network is a multi-hop, centerless wireless network, also known as multi-hop network, infrastructureless network. In the entire AD-HOC network, there is no fixed infrastructure, each node is mobile and can dynamically maintain contact with other nodes in any way. In such a network, due to the limited wireless coverage range of the terminal, two terminals that cannot directly communicate with each other can perform packet forwarding by using other nodes.

In this embodiment, each terminal can be regarded as a node in the AD-HOC network.

Terminals within the AD-HOC network can communicate in a half-duplex communication mode or a full-duplex communication mode. Functional modes supported by the AD-HOC network include a voice mode, a WeChat® voice message mode, a real-time voice call mode, and the like, which is not limited herein.

At block 204, the terminal transmits target data within the AD-HOC network.

As can be seen, in the embodiments of the present disclosure, when detecting the request for launching the predetermined application, the terminal enables the LAN-wireless communication module, then adjusts the LAN-wireless communication module to operate in the operation mode, and finally transmits the target data within a preset range with aid of the LAN-wireless communication module and the antenna, where the distance between any two positions within the preset range is less than or equal to the preset distance. Thus, the terminal can implement an enhanced data transmission by being equipped with an external power amplifier and an external low-noise filter, thereby increasing an effective distance that the terminal performs LAN communication, which is beneficial to expand the use of LAN communication function of the terminal, satisfy various requirements of specific scenarios such a scenario without mobile network, and expand functionality and applicability of the terminal.

As an embodiment, the target data includes at least one of: voice data, location data, map data, and address book data.

As can be seen, in this embodiment, transmitted-data's types supported by the terminal are more comprehensive, thereby improving the applicability.

As an embodiment, the target data is the voice data and the location data, and the location data is global position system (GPS) information. The method further includes the following.

The terminal displays a predetermined interface, and the predetermined interface includes an area for location display and an area for contact display. The terminal scans the other terminals within the preset range, establishes a communication connection with the other terminals scanned, and displays the voice data in the area for contact display. The terminal displays locations in the area for location display according to the location data.

The predetermined interface is a preset functional interface configured to display the target data.

As an embodiment, as illustrated in FIG. 2B, suppose that the LAN where the LAN-wireless communication module is located has user A, user B, user C, and user D. User A, user B, user C, and user D share location information with each other. The terminal can receive location information shared by other terminals within the LAN, display offline map in the area for location display of the predetermined interface, display corresponding location information on the offline map, and display the voice data of all users in the area for contact display, so as to achieve LAN voice communication function.

As can be seen, in this embodiment, in the process of transmitting the target data in the LAN, the terminal can display the target data on the predetermined interface synchronously, so that the user can query on demand on an interactive interface, thereby improving the convenience of data usage.

As an embodiment, the target data is the address book data, and the method further includes the following.

The terminal displays a predetermined interface, and the preset interface is configured to display the address book data. The terminal searches for communication information of a target user from the address book data according to a query request from a user.

As can be seen, in the embodiment, the terminal supports a long-distance address book data share in the LAN, thereby improving security and convenience and being suitable for specific scenario requirements.

As an embodiment, the method further includes the following.

The terminal sends a request for networking to the other terminals, receives from a target device a response for networking, and transmits networking data through the target device. The networking data is data that needs to be transmitted over a mobile network.

The request for networking sent by the terminal is configured to request the other terminals in the LAN to transmit networking data of the terminal.

The terminal may continue to be in a disconnected state, in this case, if the user needs to transmit data over the network, transfer-communication may need to be conducted with aid of the other terminals in the current LAN. The target device is in a networking state, and can send the response for networking to the terminal and forward the networking data of the terminal.

As can be seen, in this embodiment, by transferring, with the target terminals in the LAN, the data that needs to be sent through the mobile network, the mobile terminal can communicate with external terminals, thereby improving the communication capability of the terminal.

As an embodiment, the method further includes the following.

The terminal sends a notification for networking to the other terminals in response to detecting that the terminal is in a networking state. The terminal receives from a target device a request for networking and forwards networking data received from the target device. The networking data is data that needs to be transmitted over a mobile network.

The notification for networking sent by the terminal is configured to inform that the terminal is connected to the Internet and can forward the data that needs to be transmitted over the mobile network.

As can be seen, when detecting that the terminal is capable of a networking, the terminal can send the notification for networking to the other terminals in the LAN, thereby providing networking services for the target device with networking needs and expanding the communication capability of the terminal.

Figure 3:
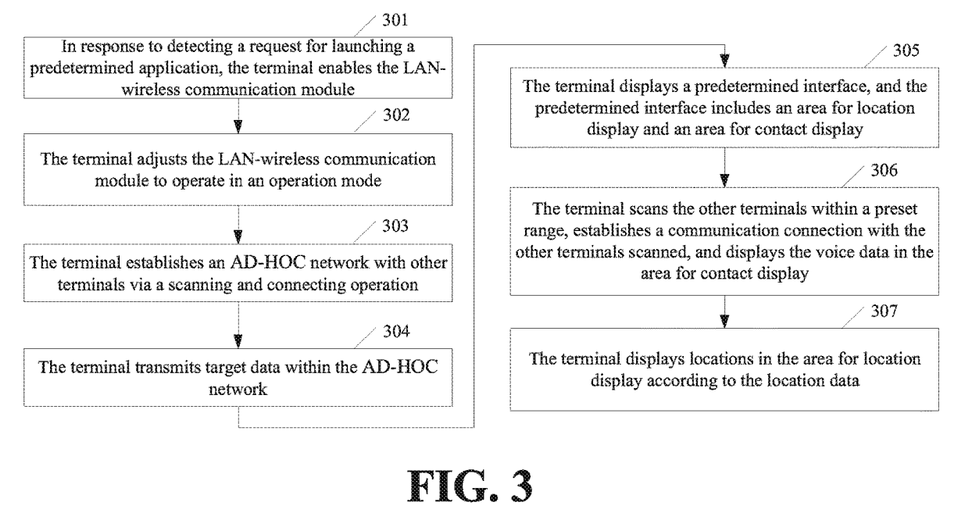
FIG. 3 is a flowchart illustrating a method for transmitting data according to another embodiment of the present disclosure.

Corresponding to the embodiments illustrated in FIG. 2A, FIG. 3 is a flowchart illustrating a method for transmitting data according to another embodiment of the present disclosure. The method for transmitting data is applicable to the terminal as illustrated in FIG. 1A to 1F. The terminal includes a LAN-wireless communication module. As illustrated in FIG. 3, the method or transmitting data begins with operations at block 301.

At block 301, in response to detecting a request for launching a predetermined application, the terminal enables the LAN-wireless communication module.

At block 302, the terminal adjusts the LAN-wireless communication module to operate in an operation mode.

At block 303, the terminal establishes an AD-HOC network with other terminals via a scanning and connecting operation, a distance between the other terminals and the terminal being less than or equal to a preset distance.

At block 304, the terminal transmits target data within the AD-HOC network. The target data is the voice data and the location data, and the location data is GPS information At block 305, the terminal displays a predetermined interface, and the predetermined interface includes an area for location display and an area for contact display.

At block 306, the terminal scans the other terminals within a preset range, establishes a communication connection with the other terminals scanned, and displays the voice data in the area for contact display.

At block 307, the terminal displays locations in the area for location display according to the location data.

As can be seen, in the embodiments of the present disclosure, in response to detecting the request for launching the predetermined application, the terminal enables the LAN-wireless communication module, then adjusts the LAN-wireless communication module to operate in the operation mode, and finally transmits the target data within the preset range with aid of the LAN-wireless communication module and the antenna. The distance between any two positions within the preset range is less than or equal to the preset distance. Thus, the terminal can implement an enhanced data transmission by being equipped with an external power amplifier and an external low-noise filter, thereby increasing an effective distance that the terminal performs LAN communication, which is beneficial to expand the use of LAN communication function of the terminal, satisfy various requirements of specific scenarios such a scenario without mobile network, and expand functionality and applicability of the terminal.

As can be seen, in this embodiment, in the process of transmitting the target data in the LAN, the terminal can display the target data on the predetermined interface synchronously, so that the user can query on demand on an interactive interface, thereby improving the convenience of data usage.

Figure 4:
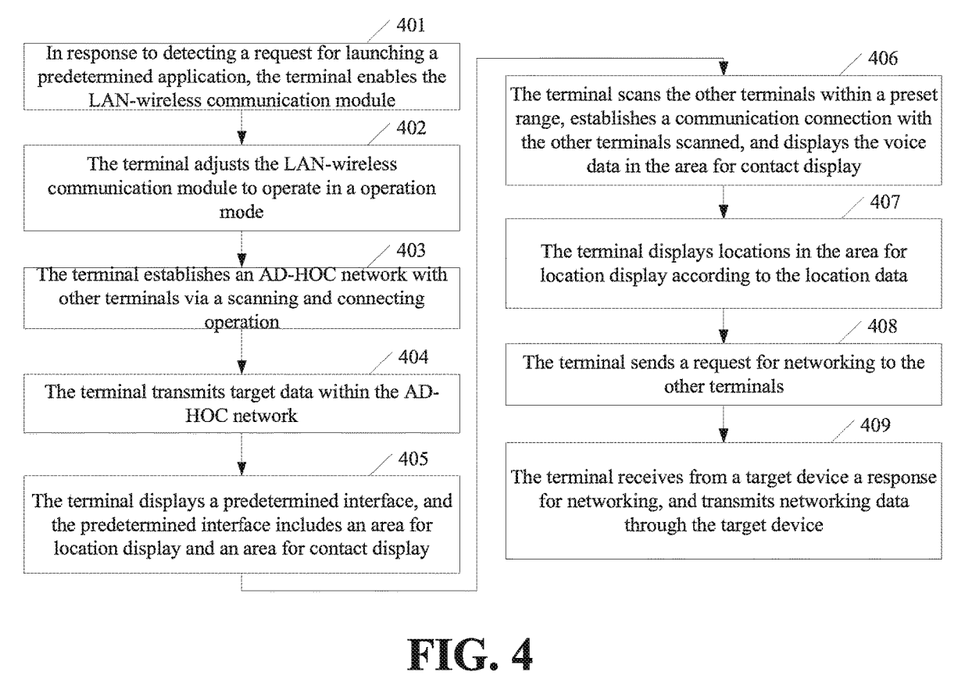
FIG. 4 is a flowchart illustrating a method for transmitting data according to another embodiment of the present disclosure.

Corresponding to the embodiments illustrated in FIG. 2A, FIG. 4 is a flowchart illustrating a method for transmitting data according to another embodiment of the present disclosure. The method for transmitting data is applicable to the terminal as illustrated in FIG. 1A to 1F. The terminal includes a LAN-wireless communication module. As illustrated in FIG. 4, the method or transmitting data begins with operations at block 401.

At block 401, in response to detecting a request for launching a predetermined application, the terminal enables the LAN-wireless communication module.

At block 402, the terminal adjusts the LAN-wireless communication module to operate in an operation mode.

At block 403, the terminal establishes an AD-HOC network with other terminals via a scanning and connecting operation, a distance between the other terminals and the terminal being less than or equal to a preset distance.

At block 404, the terminal transmits target data within the AD-HOC network. The target data is the voice data and the location data, and the location data is GPS information.

At block 405, the terminal displays a predetermined interface, and the predetermined interface includes an area for location display and an area for contact display.

At block 406, the terminal scans the other terminals within a preset range, establishes a communication connection with the other terminals scanned, and displays the voice data in the area for contact display.

At block 407, the terminal displays locations in the area for location display according to the location data.

At block 408, the terminal sends a request for networking to the other terminals.

At block 409, the terminal receives from a target device a response for networking, and transmits networking data through the target device. The networking data is data that needs to be transmitted over a mobile network.

As can be seen, in the embodiments of the present disclosure, in response to detecting the request for launching the predetermined application, the terminal enables the LAN-wireless communication module, then adjusts the LAN-wireless communication module to operate in the operation mode, and finally transmits the target data within the preset range with aid of the LAN-wireless communication module and the antenna. The distance between any two positions within the preset range is less than or equal to the preset distance. Thus, the terminal can implement an enhanced data transmission by being equipped with an external power amplifier and an external low-noise filter, thereby increasing an effective distance that the terminal performs LAN communication, which is beneficial to expand the use of LAN communication function of the terminal, satisfy various requirements of specific scenarios such a scenario without mobile network, and expand functionality and applicability of the terminal.

Furthermore, in the process of transmitting the target data in the LAN, the terminal can display the target data on the predetermined interface synchronously, so that the user can query on demand on an interactive interface, thereby improving the convenience of data usage.

In addition, the terminal can communicate with the outside world by the target device in the LAN transiting the data that needs to be sent through the mobile network, thereby improving the communication capability of the terminal.

Figure 5:
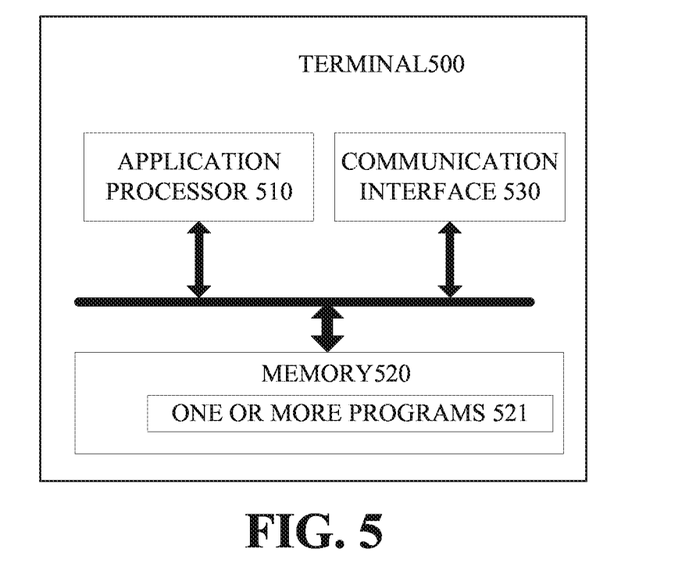
FIG. 5 is a block diagram illustrating a terminal according to an embodiment of the present disclosure.

Corresponding to the embodiments illustrated in FIG. 2A, FIG. 3, and FIG. 4, FIG. 5 is a block diagram illustrating a terminal 500 according to an embodiment of the present disclosure. As illustrated in FIG. 5, the terminal 500 includes a processor 510, a memory 520, a communication interface 530, and one or more programs 521. The one or more programs 521 are stored in the memory 520 and are configured to be executed by the processor 510. The one or more programs 521 include instructions operable to execute the following operations.

The LAN-wireless communication module is enabled in response to a request for launching a predetermined application being detected. The LAN-wireless communication module is adjusted to operate in an operation mode. An AD-HOC network is established with other terminals via a scanning and connecting operation, a distance between the other terminals and the terminal being less than or equal to a preset distance. Target data is transmitted within the AD-HOC network.

The communication interface 530 can be the LAN-wireless communication module.

As can be seen, in the embodiments of the present disclosure, in response to detecting the request for launching the predetermined application, the terminal enables the LAN-wireless communication module, then adjusts the LAN-wireless communication module to operate in the operation mode, and finally transmits the target data within a preset range with aid of the LAN-wireless communication module and the antenna. The distance between any two positions within the preset range is less than or equal to the preset distance. Thus, the terminal can implement an enhanced data transmission by being equipped with an external power amplifier and an external low-noise filter, thereby increasing an effective distance that the terminal performs LAN communication, which is beneficial to expand the use of LAN communication function of the terminal, satisfy various requirements of specific scenarios such a scenario without mobile network, and expand functionality and applicability of the terminal.

As an embodiment, the target data includes at least one of: voice data, location data, map data, and address book data.

As an embodiment, the target data is the voice data and the location data, and the location data is GPS information. The one or more programs 521 further include instructions operable to execute the following operations.

A predetermined interface is displayed, the predetermined interface including an area for location display and an area for contact display. The other terminals are scanned within the preset range, a communication connection is established with the other terminals scanned, and the voice data is displayed in the area for contact display. Locations are displayed in the area for location display according to the location data.

As an embodiment, the target data is the address book data, and the one or more programs 521 further include instructions operable to execute the following operations.

A predetermined interface is displayed, and the preset interface is configured to display the address book data. Communication information of a target user is searched for from the address book data according to a query request from a user.

As an embodiment, the one or more programs 521 further include instructions operable to execute the following operations.

A request for networking is sent to the other terminals. A response for networking is received from a target device and networking data is transmitted through the target device. The networking data is data that needs to be transmitted over a mobile network.

As an embodiment, the one or more programs 521 further include instructions operable to execute the following operations.

A notification for networking is sent to the other terminals in response to detecting that the terminal is in a networking state. A request for networking is received from a target device and networking data received from the target device is forwarded. The networking data is data that needs to be transmitted over a mobile network.

The foregoing solution of the embodiments of the disclosure is mainly described from the viewpoint of execution process of the method. It can be understood that, in order to implement the above functions, the terminal includes hardware structures and/or software modules corresponding to the respective functions. Those skilled in the art should readily recognize that, in combination with the example units and scheme steps described in the embodiments disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the embodiments of the disclosure, functional units may be divided for the terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the embodiments of the present disclosure is schematic, and is merely a logical function division, and there may be other division manners in actual implementation.

Figure 6:
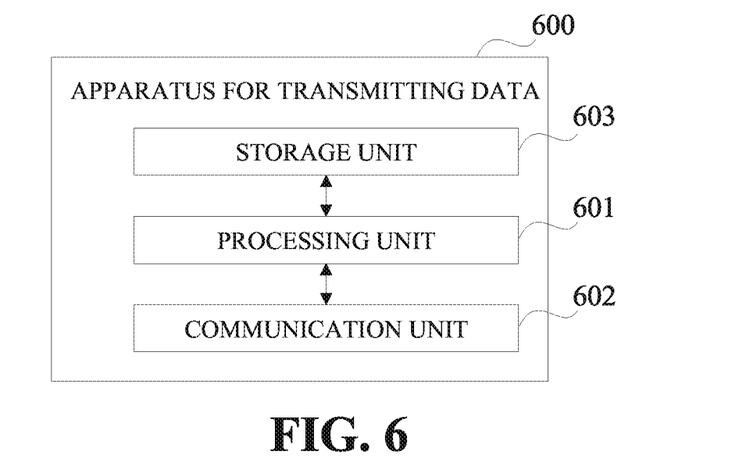
FIG. 6 is a block diagram illustrating an apparatus for transmitting data according to an embodiment of the present disclosure.

FIG. 6 is a block diagram illustrating an apparatus for transmitting data 600 according to an embodiment of the present disclosure. The apparatus for transmitting data 600 is applicable to the terminal illustrated in FIG. 1A to 1F. The terminal includes a LAN-wireless communication module. The apparatus for transmitting data 600 includes a processing unit 601 and a communication unit 602.

The processing unit 601 is configured to enable the LAN-wireless communication module through the communication unit 602 in response to detecting a request for launching a predetermined application; adjust the LAN-wireless communication module to operate in an operation mode; establish an AD-HOC network with other terminals via a scanning and connecting operation, a distance between the other terminals and the terminal being less than or equal to a preset distance; transmit target data within the AD-HOC network.

The apparatus for transmitting data 600 may further include a storage unit 603. The storage unit 603 is configured to store program codes and data of the terminal. The processing unit 601 may be an application processor, and the communication unit 602 may be a global communication bus, a transceiver, etc., and the storage unit 603 may be a memory.

As can be seen, in the embodiments of the present disclosure, in response to detecting the request for launching the predetermined application, the terminal enables the LAN-wireless communication module, then adjusts the LAN-wireless communication module to operate in the operation mode, and finally transmits the target data within a preset range with aid of the LAN-wireless communication module and the antenna. The distance between any two positions within the preset range is less than or equal to the preset distance. Thus, the terminal can implement an enhanced data transmission by being equipped with an external power amplifier and an external low-noise filter, thereby increasing an effective distance that the terminal performs LAN communication, which is beneficial to expand the use of LAN communication function of the terminal, satisfy various requirements of specific scenarios such a scenario without mobile network, and expand functionality and applicability of the terminal.

As an embodiment, the target data includes at least one of: voice data, location data, map data, and address book data.

As an embodiment, the target data is the voice data and the location data, and the location data is GPS information. The processing unit 601 is further configured to display a predetermined interface, the predetermined interface including an area for location display and an area for contact display; scan the other terminals within the preset range, establish a communication connection with the other terminals scanned, and display the voice data in the area for contact display; display locations in the area for location display according to the location data through the communication unit 602.

As an embodiment, the target data is the address book data. The processing unit 601 is further configured to display a predetermined interface, the preset interface being configured to display the address book data; search for communication information of a target user from the address book data according to a query request from a user.

As an embodiment, the processing unit 601 is further configured to send, through the communication unit 602, a request for networking to the other terminals; receive, through the communication unit 602, from a target device a response for networking and transmit networking data through the target device, the networking data being data that needs to be transmitted over a mobile network.

As an embodiment, the processing unit 601 is further configured to send, through the communication unit 602, a notification for networking to the other terminals in response to detecting that the terminal is in a networking state; receive, through the communication unit 602, from a target device a request for networking and forward networking data received from the target device, the networking data being data that needs to be transmitted over a mobile network.

Embodiments of the present disclosure also provide a computer readable storage medium. The computer readable storage medium stores computer programs for electronic data interchange which, when executed, are operable with a computer to execute all or part of the operations of any of the methods described in the above-described method embodiments. The computer may include the terminal.

Embodiments of the present disclosure also provide a computer program product. The computer program product includes a non-transitory computer readable storage medium that stores computer programs. The computer programs are operable with a computer to perform all or part of the operations of any of the methods described in the above method embodiments. The computer program product may be a software installation package. The computer may include a terminal.

It is to be noted that, for the sake of simplicity, the foregoing method embodiments are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the disclosure, the apparatus disclosed in embodiments provided herein may be implemented in other manners. For example, the device/apparatus embodiments described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among terminals or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various embodiments of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the embodiments described above may be accomplished by means of a program to instruct associated hardware, the program may be stored in a computer-readable memory, which may include a flash memory, a read-only memory (ROM), a random-access memory (RAM), Disk or compact disc (CD), and so on.

The embodiments of the present disclosure are described in detail above, and the principles and implementations of the present disclosure are described herein by using specific embodiments. The description of the above embodiments is only for helping to understand the method and the technical solutions of the present disclosure. For those of ordinary skill in the art, there will be changes in specific implementations and applications according to the idea of the present disclosure. In conclusion, the content of the specification should not be understood as limiting the disclosure.

What is claimed is:

1. A terminal, comprising:
an antenna;
a local area network (LAN)-wireless communication module, coupled with the antenna; and
an application processor, coupled with the LAN-wireless communication module;
the LAN-wireless communication module being operable in an operation mode and a bypass mode;
the terminal being configured to implement an enhanced signal transmission-reception function in LAN and a signal transmitted by the terminal having an effective transmission distance greater than a preset distance, when the LAN-wireless communication module operates in the operation mode;
the terminal being configured to implement a short-haul signal transmission-reception function in the LAN and a signal transmitted by the terminal having an effective transmission distance less than the preset distance when the LAN-wireless communication module operates in the bypass mode; and the terminal being configured to enable the LAN-wireless communication module in response to detecting a request for launching a predetermined application; adjust the LAN-wireless communication module to operate in the operation mode; establish an AD-HOC network with other terminals via a scanning and connecting operation, a distance between the other terminals and the terminal being less than or equal to a preset distance; and transmit target data within the AD-HOC network.

2. The terminal of claim 1, wherein the LAN-wireless communication module comprises a received-signal processing circuit and a transmitted-signal processing circuit.

3. The terminal of claim 2, wherein the received-signal processing circuit comprises a demodulation circuit module, a receiver, and an external low-noise filter, and wherein the demodulation circuit module is coupled with the receiver, the receiver is coupled with the external low-noise filter, and the external low-noise filter is coupled with the antenna; and the external low-noise filter is operable in the operation mode, the operation mode is configured for implementing an enhanced signal-reception function in the LAN, and the enhanced signal-reception function has an effective transmission distance greater than the preset distance.

4. The terminal of claim 3, wherein the transmitted-signal processing circuit comprises a modulation circuit module, a transmitter, and an external power amplifier, and wherein the application processor is coupled with the modulation circuit module and the demodulation circuit module, the modulation circuit module is coupled with the transmitter, the transmitter is coupled with the external power amplifier, and the external power amplifier is coupled with the antenna; and the external power amplifier is operable in the operation mode, the operation mode is configured for implementing an enhanced signal-transmission function in the LAN, and the enhanced signal-transmission function has an effective transmission distance greater than the preset distance.

5. The terminal of claim 3, wherein the terminal further comprises:

an audio decoder, coupled with the demodulation circuit module; and a speaker, coupled with the audio decoder.

6. The terminal of claim 4, wherein the terminal further comprises:

an audio encoder, coupled with the modulation circuit module; and a microphone, coupled with the audio encoder.

7. The terminal of claim 3, wherein the receiver comprises an integrated low-noise filter, a first mixer, a second mixer, a first in-phase and quadrature (IQ) phase modulation module, a first local oscillator, a first image-reject filter, a second image-reject filter, a first variable gain amplifier, and a second variable gain amplifier;

wherein the demodulation circuit module comprises a first analog-to-digital converter, a second analog-to-digital converter, a third mixer, a fourth mixer, a second IQ phase modulation module, a second digital-signal processing chip, and a second local oscillator;

wherein the external low-noise filter is coupled with the integrated low-noise filter, the integrated low-noise filter is coupled with the first mixer and the second mixer, the first mixer and the second mixer are coupled with the first IQ phase modulation module, the first IQ phase modulation module is coupled with the first local oscillator, the first mixer is coupled with the first image-reject filter, the first image-reject filter is coupled with the first variable gain amplifier, the first variable gain amplifier is coupled with the first analog-to-digital converter, the first analog-to-digital converter is coupled with the third mixer, the third mixer is coupled with the second digital-signal processing chip, the second image-reject filter is coupled with the second variable gain amplifier, the second variable gain amplifier is coupled with the second analog-to-digital converter, the second analog-to-digital converter is coupled with the fourth mixer, the fourth mixer is coupled with the second digital-signal processing chip, the third mixer and the fourth mixer are coupled with the second IQ phase modulation module, and the second IQ phase modulation module is coupled with the second local oscillator; and the first image-reject filter is coupled with the second image-reject filter, and the first analog-to-digital converter is coupled with the second analog-to-digital converter.

8. The terminal of claim 4, wherein the modulation circuit module comprises: a first digital-signal processing chip, a coordinate rotation digital computer, a differential circuit module, a first digital-to-analog converter; and a second digital-to-analog converter;

wherein the transmitter comprises a first low-pass filter, a second low-pass filter, a phase-locked loop circuit module, and an integrated power amplifier; and wherein the first digital-signal processing chip is coupled with the coordinate rotation digital computer, the coordinate rotation digital computer is coupled with the first digital-to-analog converter and the differential circuit module, the differential circuit module is coupled with the second digital-to-analog converter, the first digital-to-analog converter is coupled with the first low-pass filter, the second digital-to-analog converter is coupled with the second low-pass filter, the second low-pass filter is coupled with the phase-locked loop circuit module, the phase-locked loop circuit module is coupled with the integrated power amplifier, and the integrated power amplifier is coupled with the external power amplifier.

9. The terminal of claim 3, wherein the received-signal processing circuit further comprises a pre-filter, and the pre-filter is coupled with the antenna and the external low-noise filter.

10. A method for transmitting data, being applicable to a terminal comprising a LAN-wireless communication module, the method comprising:

enabling the LAN-wireless communication module, in response to detecting a request for launching a predetermined application, wherein the LAN-wireless communication module being operable in an operation mode and a bypass mode, the terminal is configured to implement an enhanced signal transmission-reception function in LAN and a signal transmitted by the terminal having an effective transmission distance greater than a preset distance when the LAN-wireless communication module operates in the operation mode, and the terminal is configured to implement a short-haul signal transmission-reception function in the LAN and a signal transmitted by the terminal has an effective transmission distance less than the preset distance when the LAN-wireless communication module operates in the bypass mode;

adjusting the LAN-wireless communication module to operate in the operation mode;

establishing an AD-HOC network with other terminals via a scanning and connecting operation, a distance between the other terminals and the terminal being less than or equal to a preset distance; and transmitting target data within the AD-HOC network.

11. The method of claim 10, wherein the target data comprises at least one of: voice data, location data, map data, and address book data.

12. The method of claim 11, further comprising:

displaying a predetermined interface, the predetermined interface comprising an area for location display and an area for contact display, the target data being the voice data and the location data, and the location data beings global position system (GPS) information;

scanning the other terminals within a preset range, establishing a communication connection with the other terminals scanned, and displaying the voice data in the area for contact display; and displaying locations in the area for location display according to the location data.

13. The method of claim 11, further comprising:

displaying a predetermined interface, the preset interface being configured to display the address book data, the target data being the address book data; and searching for communication information of a target user from the address book data according to a query request from a user.

14. The method of claim 10, further comprising:

sending a request for networking to the other terminals; and receiving from a target device a response for networking and transmitting networking data through the target device, the networking data being data that needs to be transmitted over a mobile network.

15. The method of claim 10, further comprising:

sending a notification for networking to the other terminals in response to detecting that the terminal is in a networking state; and receiving from a target device a request for networking and forwarding networking data received from the target device, the networking data being data that needs to be transmitted over a mobile network.

16. A terminal, comprising an application processor, a memory, a communication interface, and one or more programs stored in the memory and configured to be executed by the application processor, the one or more programs comprising instructions to:

enable the LAN-wireless communication module, in response to detecting a request for launching a predetermined application, wherein the LAN-wireless communication module being operable in an operation mode and a bypass mode, the terminal is configured to implement an enhanced signal transmission-reception function in LAN and a signal transmitted by the terminal having an effective transmission distance greater than a preset distance when the LAN-wireless communication module operates in the operation mode, and the terminal is configured to implement a short-haul signal transmission-reception function in the LAN and a signal transmitted by the terminal has an effective transmission distance less than the preset distance when the LAN-wireless communication module operates in the bypass mode;

adjust the LAN-wireless communication module to operate in the operation mode;

establish an AD-HOC network with other terminals via a scanning and connecting operation, a distance between the other terminals and the terminal being less than or equal to a preset distance; and transmit target data within the AD-HOC network.

17. The terminal of claim 16, wherein the target data comprises at least one of: voice data, location data, map data, and address book data.

18. The terminal of claim 17, wherein the one or more programs further comprise instructions to:

display a predetermined interface, the predetermined interface comprising an area for location display and an area for contact display, the target data being the voice data and the location data, and the location data beings global position system (GPS) information;

scan the other terminals within a preset range, establish a communication connection with the other terminals scanned, and display the voice data in the area for contact display; and display locations in the area for location display according to the location data.

19. The terminal of claim 17, wherein the one or more programs further comprise instructions to:

display a predetermined interface, the preset interface being configured to display the address book data, the target data being the address book data; and search for communication information of a target user from the address book data according to a query request from a user.

20. The terminal of claim 16, wherein the one or more programs further comprise instructions to:

send a request for networking to the other terminals; and receive from a target device a response for networking and transmitting networking data through the target device, the networking data being data that needs to be transmitted over a mobile network.

* * * * *